United States Patent [19]

Meyer et al.

[11] Patent Number: 5,511,821
[45] Date of Patent: Apr. 30, 1996

[54] VEHICLE RESTRAINT SYSTEM CUSHION WITH SACRIFICIAL TEAR SEAM

[75] Inventors: Scott A. Meyer, N. Ogden; Timothy M. Martersteck, Ogden, both of Utah

[73] Assignee: Morton International, Inc., Chicago, Ill.

[21] Appl. No.: 361,085

[22] Filed: Dec. 21, 1994

[51] Int. Cl.$^6$ ................................................ B60R 21/16
[52] U.S. Cl. ........................................ 280/743.1; 280/729
[58] Field of Search .......................... 280/743 R, 743 A, 280/728 A, 729

[56] References Cited

U.S. PATENT DOCUMENTS

| | | | |
|---|---|---|---|
| 4,186,941 | 2/1980 | Scholz et al. | 280/743 R |
| 5,048,863 | 9/1991 | Henseler et al. | 280/743 R |
| 5,094,477 | 3/1992 | Togawa | 280/743 R |
| 5,280,954 | 1/1994 | Henseler et al. | 280/743 R |
| 5,421,610 | 6/1995 | Kavanaugh et al. | 280/743.1 |

FOREIGN PATENT DOCUMENTS

| | | | |
|---|---|---|---|
| 2030863 | 6/1970 | Germany | 316/180 |
| 3-67748 | 3/1991 | Japan | 280/743 R |
| 136943 | 6/1991 | Japan . | |
| 4-221250 | 8/1992 | Japan | 280/743 R |
| 2257950 | 1/1993 | United Kingdom | 280/728 R |

Primary Examiner—Eric D. Culbreth
Attorney, Agent, or Firm—A. Donald Messenheimer; Gerald K. White

[57] ABSTRACT

An inflatable air bag cushion for use in a vehicle restraint system that reduces the load experienced on the peripheral seam of a driver or passenger air bag to reduce or prevent combing of the cushion fabric. A sacrificial stitched seam 26 is sewn inboard of the standard peripheral seam 20 on the cushion. Upon inflation, the sacrificial seam tears at a predetermined cushion pressure slightly lower than the maximum. The outer stitched seam, composed of a stronger thread, survives throughout the cushion deployment. The final load experienced by the outer stitched seam and adjacent fabric is reduced. As a result, lower strength fabrics may be utilized which will reduce overall cushion costs.

10 Claims, 1 Drawing Sheet

5,511,821

VEHICLE RESTRAINT SYSTEM CUSHION WITH SACRIFICIAL TEAR SEAM

This invention relates to vehicle restraint systems having air bag cushions, and more particularly to a cushion construction that has improved resistance to combing of the fabric at a seam between two panels.

BACKGROUND

Air bags are frequently made of at least two panels of a woven fabric that are joined at an outer marginal edge by a stitched seam using threads that have sufficient strength to withstand the maximum pressure that follows when the gas generator is actuated such as at the time of a vehicle collision. More specifically, current cushions use peripheral seam designs which are expected to survive the deployment of the air bag. These seams tend to result in "combing" where cushion fabric begins tearing adjacent to stitches when the cushion fabric is marginal for the inflator performance being used.

SUMMARY OF INVENTION

It is an object of the invention to provide a novel air bag cushion and method of construction and use which will reduce the load applied to or experienced on the peripheral outer main seam of a driver or passenger side air bag cushion.

The air bag cushion according to the invention includes a sacrificial seam located closely adjacent to and inboard of the peripheral outer main seam that secures together two fabric panels which are used to form the air bag cushion. Upon inflation of the air bag which occurs during cushion deployment, the sacrificial seam tears without significantly changing the deployment pattern of the folded bag or destroying the integrity of the air bag as would occur if the outer seam failed.

In a preferred embodiment the outer main seam may be formed while the bag is turned inside-out, by one or more, usually two, rows of stitches of a thread sufficiently strong as not to break. A sacrificial seam is also added while the bag remains inside-out. The sacrificial seam may be made of a continuous row of stitches of a thread having a lower strength that will fail at a predetermined load that will be exceeded by the inflator being used just prior to full bag inflation. This design will reduce the final load that the outer main stitched seam and adjacent fabric would experience, thereby preventing or at least reducing combing which would otherwise occur. Using this concept allows lower strength fabrics to be used which reduces overall cost of the cushion.

These and other objects and advantages of the invention will become more fully apparent from the claims and from a perusal of the following description in connection with the appended drawings.

DETAILED DESCRIPTION OF PREFERRED EMBODIMENTS

Figure 1:
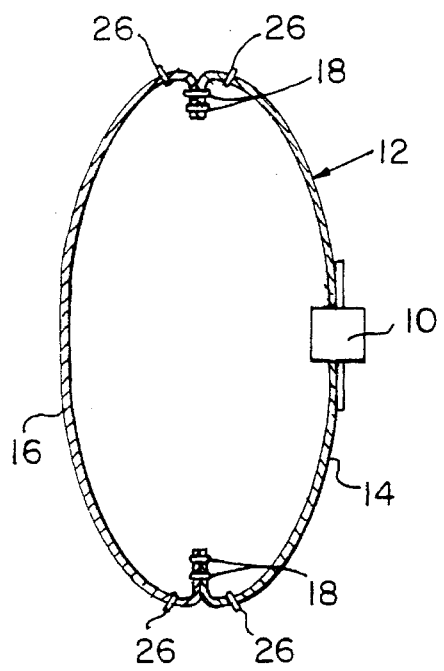
FIG. 1 is a schematic elevation in section of an air bag cushion of an embodiment of an air bag restraint system in accordance with the present invention.
Figure 2:
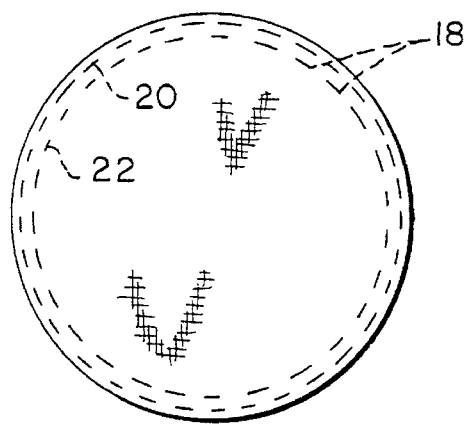
FIG. 2 is a plan view of a conventional air bag cushion shown inside out with two rows of stitches as is commonly used.

The air bag restraint system diagrammatically shown in FIG. 1 includes a gas generator 10 arranged to generate high pressure gas to be supplied to the air bag cushion 12 in the event of a vehicle collision or the like. The air bag system for the driver side is typically formed of a back panel 14 that is attached to the steering column in a manner well known to those skilled in this art. Back panel 14 and front panel 16 may both have circular outer peripheries or marginal edges that are secured together by a main seam 18. As shown in FIG. 2, seam 18 may be formed by one or more, usually two, rows of stitches 20,22 around the peripheral edge of the fabric of the two panels while the panels are turned inside-out as is conventional. Before use, the bag is turned right side out prior to folding. Frequently, an opening is provided in the middle of the rear panel and fitted to the opening of the gas generator 10 either in the steering column as in U.S. Pat. No. 5,280,954 to Henesler et al. or on the dash board in front of the passenger seat.

Figure 3:
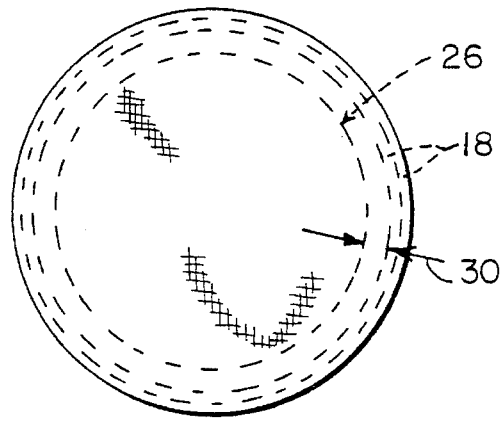
FIG. 3 is view similar to FIG. 2 but showing the new tear seam according to the invention.

Current cushions that use stitched seams are expected to survive the deployment of the air bag. These seams tend to result in combing where the cushion fabric begins tearing adjacent to seam stitches when the cushion fabric strength is marginal for the inflator performance being used. According to this invention, such combing may be prevented or at least reduced to an acceptable level, by adding a sacrificial seam 26 as illustrated in FIG. 3. The purpose of the sacrificial seam is to tear upon cushion deployment. Seam 26 is purposely designed to have a lower strength than the outer seam 18 so that it will fail at a predetermined load that may be between about 75% and 95% of the maximum load. The outer main seam 18 then survives throughout the entire cushion deployment.

While the sacrificial seam 26 may be formed as by bonded or welded seams, it is preferred to use a seam with stitches of a thread having a lower strength than that of the thread in stitches 20,22 which form the main seam. Also it is efficient to sew the sacrificial seam 26 when the air bag is turned inside-out. With a circular outer main seam, the sacrificial seam 26 may be made concentric as illustrated in FIG. 3. In the event the outer main seam follows a different path as is frequently the case with passenger side installations, the sacrificial seam 26 should be generally parallel so that the spacing is substantially uniform.

The spacing distance 30 between sacrificial seam 26 and the main seam 20 may vary. The inflator performance and the strength of the fabric influence the determination of an optimum distance 30. After the sacrificial seam 26 fails, an incremental increase in bag volume is provided without affecting the direction of normal bag deployment. As the explosive charge creating the gas pressure for deployment is short lived, and as the air bag exhausts very rapidly after being filled, there is a time delay created before the final load reaches the outer main seam 18 because of the tearing of the sacrificial seam 26. This deployment process results in a reduction of the final load that the outer main stitches and adjacent fabric would experience. A representative spacing distance 30 of between about 3 to 10 centimeters or somewhat greater has been found to be appropriate for some applications. It is not intended that the orientation or direction of deployment be altered by reason of the sacrificial seam which is closely spaced and generally parallel to the outer main seam.

While several embodiments of the invention have been described, other changes and variations are possible without departing from the spirit of the invention. For example, tethers and rip seams for guiding the deployment may also be used with the present invention. All changes which fall within the scope of the claims are intended to be covered thereby.

What is claimed is:

1. An inflatable impact protection air bag cushion having a back panel made of a fabric with a marginal edge and a central portion fastened to a vehicle at a location which provides inflation gas to an opening in the back panel from an inflator in the event of a collision, said air bag also having a front panel made of a fabric with a marginal edge that is joined to the back panel marginal edge by a main seam while the bag is turned inside out with stitches of threads having a strength sufficiently high to cause the cushion fabric to comb at said stitches due to normal maximum inflation gas pressure;

a sacrificial seam formed to be coextensive with the main seam and having a strength which causes said sacrificial seam to tear during inflation just prior to the time when the maximum inflation gas pressure reaches the main seam; and said sacrificial seam being located between said opening and said main seam to be subjected to the maximum inflation gas pressure before said pressure reaches said main seam, said sacrificial seam being spaced generally parallel with the main seam and at a distance from the main seam that is sufficiently small so as not to substantially influence deployment while reducing the final load due to the normal maximum inflation gas pressure the main seam and adjacent fabric experience by an amount sufficient to prevent combing.

2. The cushion of claim 1 wherein the main seam is formed of stitches of a thread that is sufficiently strong so as not to break during normal deployment;

the sacrificial seam is formed of stitches of thread that will break at a predetermined load that is between 75% and 95% of the maximum load to cause the sacrificial seam to tear during deployment; and the sacrificial seam is formed of stitches that are inboard of the main seam stitches while the bag is turned inside-out and when deployed in a right side-out condition, the sacrificial seam is at the outer marginal edge of the air bag cushion.

3. The cushion of claim 2 wherein said spacing distance is between about 3 and 10 centimeters for creating a delay before maximum deployment pressure reaches the main seam.

4. An inflator impact protection cushion including;

an air bag adapted to be fastened to a vehicle and provided with an opening for receiving inflation gas from an inflator, said air bag being comprised of front and back panels of cushion fabric having marginal edges that are secured by a main seam;

the cushion fabric strength and the force on the main seam due to deploying inflation pressure being so selected that cushion fabric will at least partially fail at the main seam during normal inflation deployment; and a sacrificial seam in the same cushion fabric having a strength that is selected to fail during deployment just prior to full inflation of said cushion, said sacrificial seam being sized and positioned to add an incremental volume to the air bag cushion that is effective to prevent said failure at said main seam and a slight delay before full inflation pressure reaches the main seam.

5. The cushion of claim 4 wherein the cushion failure is manifested by combing of the fabric by stitches at the main seam.

6. The cushion of claim 5 wherein the sacrificial seam extends along the full length of the main seam and is formed to have a strength sufficiently less than that of the main seam stitches to introduce said delay when the maximum force due to inflation pressure reaches the main seam and the maximum force on the main seam is thereby reduced.

7. The cushion of claim 4 wherein:

the main seam is formed of stitches in a circular pattern applied while the bag is turned inside out and having a strength sufficiently high whereby the cause of cushion failure is due to combing of the fabric;

the sacrificial seam is formed of stitches applied while the air bag is turned inside out; and the strength of the sacrificial stitches is sufficiently low to cause the seam to rip at a predetermined inflation pressure that may be between about 75% and 95% of the maximum inflation pressure during inflation to introduce said delay when the maximum force due to inflation pressure reaches the main seam.

8. A method of making an inflatable impact protection air bag cushion comprising:

providing front and back panels of cushion fabric having peripheral mating edges;

joining the panels together via a main seam which surrounds at least a portion of the air bag, said seam being formed of stitches of thread whose strength is such that with full deployment gas pressure, the main seam tends to result in combing where the cushion fabric begins tearing adjacent to seam stitches; and reducing the combing of the cushion fabric by forming a sacrificial seam that is weaker than the main seam so that said sacrificial seam will fail at a predetermined pressure less than full deployment pressure, said sacrificial seam being closely positioned along side of said main seam and of a sufficient length to delay the time when the full deployment pressure reaches the main seam whereby the final load experienced by the main seam and adjacent fabric is reduced, without otherwise influencing directional deployment of the air bag cushion.

9. The method of claim 8 wherein the panels have circular edges that are joined together by a circular main seam and including the step of forming the sacrificial seam to be circular and concentric with the main seam with stitches of a thread that is weaker than the thread used for the main seam.

10. The method of claim 8 wherein both the main seam and the sacrificial seam are formed of stitches that are sewn while the bag is turned inside-out, and when deployed in a right side-out condition, the sacrificial seam is at the outer marginal edge of the air bag cushion.

* * * * *